United States Patent
Makino et al.

(10) Patent No.: US 11,670,815 B2
(45) Date of Patent: Jun. 6, 2023

(54) CYLINDRICAL SECONDARY CELL

(71) Applicant: Northvolt AB, Stockholm (SE)

(72) Inventors: Tetsuya Makino, Solna (SE); Daniel Lowe, Västerås (SE)

(73) Assignee: Northvolt AB, Stockholm (SE)

( * ) Notice: Subject to any disclaimer, the term of this patent is extended or adjusted under 35 U.S.C. 154(b) by 0 days.

(21) Appl. No.: 17/659,586

(22) Filed: Apr. 18, 2022

(65) Prior Publication Data

US 2022/0344749 A1    Oct. 27, 2022

(30) Foreign Application Priority Data

Apr. 22, 2021  (SE) .................................... 2150507-8

(51) Int. Cl.
*H01M 50/107* (2021.01)
*H01M 50/533* (2021.01)
*H01M 10/04* (2006.01)

(52) U.S. Cl.
CPC ..... *H01M 50/107* (2021.01); *H01M 10/0422* (2013.01); *H01M 10/0431* (2013.01); *H01M 50/533* (2021.01)

(58) Field of Classification Search
CPC ............. H01M 50/107; H01M 50/533; H01M 10/0422; H01M 10/0431; H01M 10/6551
See application file for complete search history.

(56) References Cited

U.S. PATENT DOCUMENTS

| | | |
|---|---|---|
| 2005/0287428 A1 | 12/2005 | Cheon et al. |
| 2006/0234120 A1* | 10/2006 | Hamasaki ........... H01M 50/533 |
| | | 429/211 |
| 2009/0208830 A1 | 8/2009 | Okabe et al. |
| 2020/0395587 A1 | 12/2020 | Ryu et al. |
| 2022/0123371 A1 | 4/2022 | Sugeno |
| 2022/0271403 A1* | 8/2022 | Lim ................... H01M 10/0587 |

FOREIGN PATENT DOCUMENTS

| | | |
|---|---|---|
| EP | 4044334 A2 | 8/2011 |
| EP | 2924762 A2 | 9/2015 |

(Continued)

OTHER PUBLICATIONS

Swedish Search Report for Swedish Patent Application No. 2150507-8, dated Dec. 13, 2021, (6 pages), Swedish Patent and Registration Office, Stockholm, Sweden.

(Continued)

*Primary Examiner* — Brian R Ohara
(74) *Attorney, Agent, or Firm* — Alston & Bird LLP

(57) ABSTRACT

The disclosure provides a cylindrical secondary cell (1) and a method of its assembly. The cylindrical secondary cell (1) comprises a cylindrical can (2) comprising a beading groove (3), a first conductive sheet (4), with first electrode coating (4*a*), wound to form a jelly roll (5), the first conductive sheet (4) comprises a portion free of first electrode coating (4*a*) protruding on a first end side (5*a*), and an electrode lead plate (6) arranged at the first end side (5*a*) and in direct contact with the portion free of first electrode coating (4*a*). The electrode lead plate (6) comprises a flange (6*a*) extend- (Continued)

ing away from the jelly roll (5) and arranged along the edge of the electrode lead plate (6). The beading groove (3) is arranged on the cylindrical can (2) such that the flange of the electrode lead plate (6) is bent and pressed inwards, towards a centre of the cylindrical can (2), by the beading groove (3).

13 Claims, 2 Drawing Sheets

(56) References Cited

FOREIGN PATENT DOCUMENTS

| | | | |
|---|---|---|---|
| EP | 2924762 | A3 | 11/2015 |
| EP | 4044334 | A3 | 8/2022 |
| KR | 100709862 | B1 | 4/2007 |
| WO | WO-2021/020235 | A1 | 2/2021 |

OTHER PUBLICATIONS

Notification of Intention To Grant A Patent (2 Months) for Swedish Patent Application No. 2150507-8, dated Jan. 25, 2022, (3 pages), Swedish Patent and Registration Office, Stockholm, Sweden.

Information On Grant Of A Patent for Swedish Patent Application No. 2150507-8, dated Mar. 21, 2022, (1 page), Swedish Patent and Registration Office, Stockholm, Sweden.

International Search Report and Written Opinion for International Application No. PCT/EP2022/060268, dated Sep. 12, 2022, (14 pages), European Patent Office, Rijswijk, Netherlands.

\* cited by examiner

CYLINDRICAL SECONDARY CELL

CROSS-REFERENCE TO RELATED APPLICATIONS

The present application claims priority to and the benefit of Swedish Patent Application No. 2150507-8, filed Apr. 22, 2021, the entire contents of which as are hereby incorporated by reference in their entirety.

BACKGROUND

Technical Field

The present disclosure relates to a cylindrical secondary cell and a method for assembling it.

Related Art

The transition from fossil fuels towards renewable energy has gained considerable momentum. One of the most important contributing factors is the development of better and cheaper rechargeable batteries. Currently, lithium-ion batteries are becoming increasingly popular. They represent a type of rechargeable battery in which lithium ions move from the negative electrode to the positive electrode during discharge and back when charging.

As the demand for rechargeable batteries increases, more and more focus is being placed on production speed so that producing companies can meet the demand. To achieve an effective production of rechargeable batteries, steps of the manufacturing process can be optimized. Another aspect to consider is that the rechargeable batteries must be safe to use.

A rechargeable battery, or, in other words, a secondary battery, comprises one or more secondary cells.

BRIEF SUMMARY

In view of the above, it is an aim of the disclosure to provide an improved cylindrical secondary cell for rechargeable batteries. This aim is achieved by a device and method as defined in the presented claims.

The disclosure provides a cylindrical secondary cell comprising:
  a cylindrical can comprising a beading groove formed in a wall of the cylindrical can and arranged around the circumference of the cylindrical can,
  a first conductive sheet, with first electrode coating, wound to form a jelly roll which is arranged in the can, and wherein the first conductive sheet comprises a portion free of first electrode coating which protrudes on a first end side of the jelly roll, and
  an electrode lead plate which is electrically conductive and arranged at the first end side of the jelly roll and in direct contact with at least part of the portion free of first electrode coating of the first conductive sheet,
The electrode lead plate comprises a flange extending away from the jelly roll and arranged along the edge of the electrode lead plate, and wherein the beading groove is arranged on the cylindrical can such that the flange of the electrode lead plate is bent and pressed inwards, towards a centre of the cylindrical can, by the beading groove.

By this cylindrical secondary cell, the electrode lead plate can be secured in its position in the beading process. Also, the electrode lead plate is clamped between the jelly roll and the beading groove so that the electrode lead plate holds the jelly roll in position in the cylindrical can.

Beading is a common method for cylindrical secondary cells where a groove is created in the cylindrical can side. The beading groove runs around the can side. Beading is used to form a shelf for holding a cap or lid for closing a can end side and it can also be used to form a stop which prevents the jelly roll from moving in the can.

By the claimed cylindrical secondary cell, the number of parts used, and the steps required for assembly can be minimized due to the electrode lead plate being secured between the jelly roll and the beading groove in the beading process. In other words, there is no need for any additional steps, other than the beading, to secure the jelly roll and/or the electrode lead plate.

By having a flange of the electrode lead plate that is deformed by the beading groove, the pressure of the electrode lead plate on the jelly roll is ensured so that there is good electrical contact therebetween and also so that the jelly roll is prevented from moving.

It should be noted that the disclosure herein may be used on either the positive or negative side of the cylindrical secondary cell.

The electrode lead plate comprises, for example, copper, when it is used on the negative side, i.e. the anode side, of the jelly roll. Alternative materials comprise for example, any of, or a mix of: of stainless steel, nickel, nickel/copper clad material.

The electrode lead plate comprises, for example, aluminium or stainless steel or a mixture thereof, when it is used on the positive side, i.e. the cathode side, of the jelly roll.

According to some aspects, the electrode lead plate comprises at least one slit arranged in the flange and at least the edge of the electrode lead plate. When the flange of the electrode lead plate is deformed by the beading groove, at least one slit may be used to reduce stress in the electrode lead plate that may arise from the forces in the deformation.

According to some aspects, the electrode lead plate comprises at least two slits arranged in the flange and at least the edge of the electrode lead plate in a symmetrical pattern around the edge. Depending on the material of the electrode lead plate, more or less slits can be used to reduce stress in the material. The width of the slits can also be varied. For example, the electrode lead plate may comprise two slits which are wider than if the electrode lead plate has six slits. In other words, the one or more slits may be designed depending on material and the number of slits.

According to some aspects, the electrode lead plate comprises at least one through hole for electrolyte filling. Depending on how the cylindrical secondary cell is filled with electrolyte, there may be a need to have a hole or several holes in the electrode lead plate for filling and distribution of the electrolyte inside the cell.

According to some aspects, the electrode lead plate is in direct contact with the cylindrical can. By having the lead plate in direct electrical contact with the cylindrical can, the side of the can be used as a terminal for external loads and also, the current can be led to either of the end sides of the cylindrical can for having a terminal there. Thus, it is very flexible where to arrange the terminal. Direct electrical contact means direct electrical and physical contact.

According to some aspects, the flange of the electrode lead plate is welded to the cylindrical can. Welding, in addition to securing the electrode lead plate in its position in the beading process, improves the electrical contact between the electrode lead plate and the cylindrical can.

According to some aspects, the cylindrical secondary cell comprises an insulating member arranged between the electrode lead plate and the cylindrical can. In such a case, the terminal will be arranged on the end side of the cylindrical can associated with the first end side of the jelly roll. A terminal arrangement on the end side may be arranged in electrical contact with the electrode lead plate.

According to some aspects, a part closest to the edge of the electrode lead plate is bent towards the jelly roll. In other words, when the flange of the electrode lead plate is bent inwards by the beading groove, the electrode lead plate edge may be bent towards the jelly roll.

According to some aspects, the cylindrical secondary cell comprises a lid, wherein the lid is resting on the beading groove, on a side of the beading groove opposite the electrode lead plate.

The disclosure provides a method for assembling the cylindrical secondary cell according to above. The assembling the cylindrical secondary cell comprises:
   arranging the jelly roll in the cylindrical can,
   arranging the electrode lead plate (6) in the cylindrical can so that at least part of the portion free of first electrode coating of the first conductive sheet is in direct contact with the electrode lead plate,
   beading the cylindrical can to form the beading groove at a position on the cylindrical can so that the flange of the electrode lead plate is bent and pressed inwards, towards a centre of the cylindrical can, by the beading groove.

The method provides an efficient way to secure the jelly roll and the electrode lead plate in the cylindrical can. The steps and number of components are thus minimized. The same advantages as for the above also applies here.

According to some aspects, the method comprises, before beading:
   arranging an insulating member between the electrode lead plate and the cylindrical can.

This is for the case when the electrode lead plate is electrically connected to a terminal in the end side associated with the first end side of the jelly roll and not to the cylindrical can side wall.

According to some aspects, the method comprises, welding the flange to the cylindrical can. Welding, in addition to securing the electrode lead plate in its position in the beading process, improves the electrical contact between the electrode lead plate and the cylindrical can.

According to some aspects, the beading the cylindrical can to form the beading groove also bends a part of the electrode lead plate which is closest to the edge towards the jelly roll.

BRIEF DESCRIPTION OF THE DRAWINGS

Different aspects are now described, by way of example, with reference to the accompanying drawings, in which.

DETAILED DESCRIPTION OF VARIOUS EMBODIMENTS

The disclosure is not limited to the embodiments disclosed but may be varied and modified within the scope of the claims.

Aspects of the disclosure will now be described with reference to the accompanying drawings. The device and method disclosed herein can, however, be realized in many different forms and should not be construed as being limited to the aspects set forth herein.

The terminology used herein is for the purpose of describing particular aspects of the disclosure only and is not intended to limit the invention. The singular forms "a", "an" and "the" are intended to include plural forms as well, unless the context clearly indicates otherwise.

With the term "terminal" is meant a part of a secondary cell which is to be connect to an external load.

Alternative terms for the term "can" are "case" and "housing case".

Alternative terms for the term "conductive sheet" are "conductive substrate" and "current collector".

Figure 1:
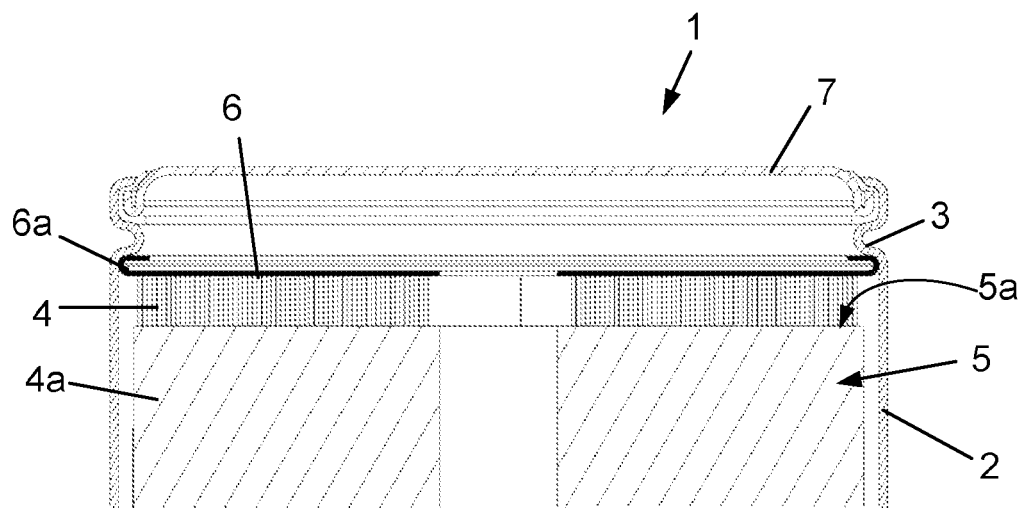
FIG. 1 shows a cut through of an example cylindrical secondary cell where an electrode lead plate and a jelly roll are secured in place in the cylindrical can by a beading groove.

FIG. 1 shows a cut through of an example cylindrical secondary cell 1 where an electrode lead plate and a jelly roll 5 are secured in place in the cylindrical can 2 by a beading groove 3.

The cylindrical secondary cell 1 comprises a cylindrical can 2 comprising a beading groove 3 formed in a wall of the cylindrical can 2 and arranged around the circumference of the cylindrical can 2. In other words, the beading groove 3 is arranged around the cylindrical wall side.

The cylindrical secondary cell 1 comprises a first conductive sheet 4, with first electrode coating 4a wound to form a jelly roll 5 which is arranged in the can.

According to some aspects, the cylindrical secondary cell 1 comprises a second conductive sheet with second electrode coating. The cylindrical secondary cell 1 may also comprise a separator sheet. The first conductive sheet 4 and the second conductive sheet, and optionally, the separator sheet, are wound to form the jelly roll 5. Alternatively, there are two separator sheets so that the first conductive sheet 4, a first separator sheet, the second conductive sheet and a second separator sheet are wound to form the jelly roll 5. It may also be the case that there is no separator sheet, for example if a solid electrolyte is used in the cylindrical secondary cell 1. For the purpose of the present disclosure, the first conductive sheet 4, with first electrode coating 4a, is the most relevant part because it might be that a second conductive sheet is realized another way in the future which does not affect the disclosure.

The first conductive sheet 4 comprises a portion free of first electrode coating 4a which protrudes on a first end side 5a of the jelly roll 5. Such a cylindrical secondary cell 1, with uncoated conductive sheet protruding on the end side of the jelly roll 5 is known as a tabless cell.

The cylindrical secondary cell 1 comprises an electrode lead plate 6 which is electrically conductive and arranged at the first end side 5*a* of the jelly roll 5 and in direct contact with at least part of the portion free of first electrode coating 4*a* of the first conductive sheet 4. In other words, and as can be seen in FIG. 1, the electrode lead plate 6 is arranged in the cylindrical can 2 directly against, and abutting, the at least part of the portion free of first electrode coating 4*a* of the first conductive sheet 4. The electrode lead plate 6 is arranged in direct electrical and physical contact with the first conductive sheet 4.

The electrode lead plate 6 comprises a flange extending away from the jelly roll 5 and arranged along the edge of the electrode lead plate 6, and wherein the beading groove 3 is arranged on the cylindrical can 2 such that the flange of the electrode lead plate 6 is bent and pressed inwards, towards a centre of the cylindrical can 2, by the beading groove 3.

In other words, the electrode lead plate 6 has a protrusion along its edge, that protrudes on a side of the electrode lead plate 6 opposite of the jelly roll 5. The flange thus points away from the jelly roll 5.

It should be noted that the flange does not need to be continuous around the whole circumference of the electrode lead plate 6. The flange may comprise several separate flanges arranged on the edge and directed away from the jelly roll 5.

The flange is, for example, made by stamping a flat electrode lead plate so that the edge is bent.

It should also be noted that in FIG. 1, the flange looks to be completely bent so that it the bend is in parallel with the rest of the electrode lead plate 6. That may be the case, but it may also be bent inwards less than shown in FIG. 1. It is sufficient that the beading groove 3 bends the flange slightly inwards.

Figures 2, 3, 4, 5:
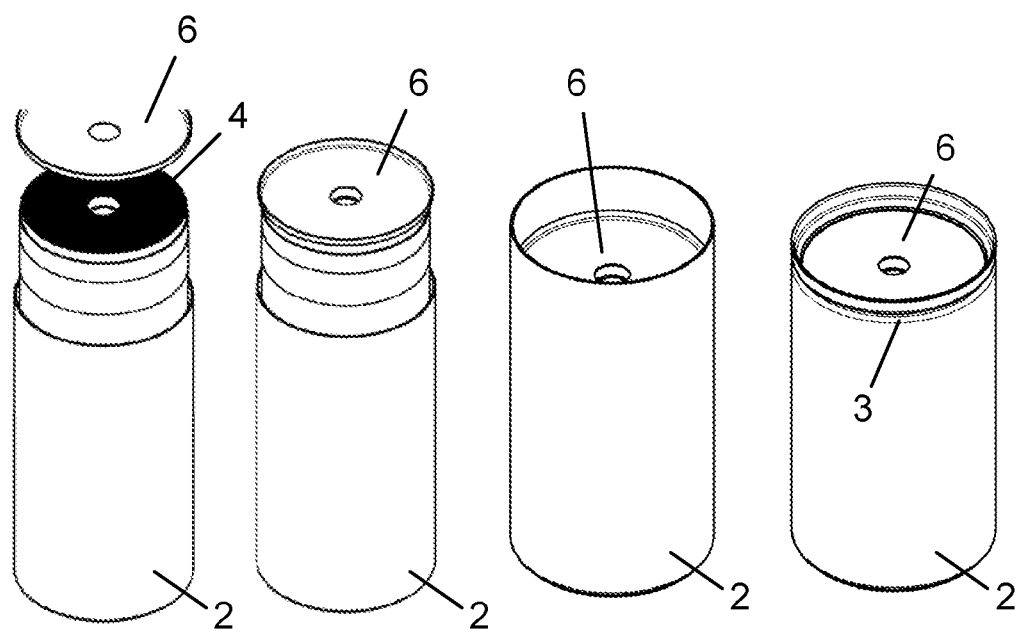
FIG. 2 shows a cylindrical can where a jelly roll is being inserted and an electrode lead plate is being put on top.
FIG. 3 shows when the electrode lead plate has been arranged against the first end side of the jelly roll.
FIG. 4 shown when the jelly roll and the electrode lead plate have been inserted fully into the cylindrical can.
FIG. 5 shows the cylindrical can after beading and how the beading groove is arranged just over the electrode lead plate to push it towards the jelly roll.

FIGS. 2-5 shows different stages when the jelly roll 5 and electrode lead plate is inserted into the cylindrical can 2. FIG. 2 shows a cylindrical can 2 where a jelly roll 5 is being inserted and an electrode lead plate is being put on top. FIG. 3 shows when the electrode lead plate has been arranged against the first end side 5*a* of the jelly roll 5. FIG. 4 shown when the jelly roll 5 and the electrode lead plate have been inserted fully into the cylindrical can 2. FIG. 5 shows the cylindrical can 2 after beading and how the beading groove 3 is arranged just over the electrode lead plate 6 to push it towards the jelly roll 5.

In FIG. 2, the dark end of the jelly roll 5 is the portion free of first electrode coating 4*a* which protrudes on a first end side 5*a* of the jelly roll 5. Directly on top of it, the electrode lead plate is arranged. It should be noted that in the figure, the electrode lead plate is not fully visible, but slightly cut off.

In FIG. 3, the electrode lead plate 6 has been arranged to abut the portion free of first electrode coating 4*a*. It may be the case that the electrode lead plate 6 is welded to the portion free of first electrode coating 4*a* or in another way conductively attached to the portion free of first electrode coating 4*a*.

In FIG. 4, the jelly roll 5 and the electrode lead plate have been arranged in the cylindrical can 2 and in FIG. 5, the cylindrical can 2 has been beaded so that the electrode lead plate is clamped towards the jelly roll 5. It should be noted that the cylindrical secondary cell 1 is not finished here; the cylindrical can 2 is open over the electrode lead plate 6 and should be closed, for example by a lid 7 as further explained below.

By this cylindrical secondary cell 1, the electrode lead plate 6 can be secured in its position in the beading process.

Also, the electrode lead plate 6 is clamped between the jelly roll 5 and the beading groove 3 so that the electrode lead plate 6 holds the jelly roll 5 in position in the cylindrical can 2.

Beading is a common method for cylindrical secondary cells where a groove is created in the cylindrical can 2 side. The beading groove 3 runs around the can side. Beading is used to form a shelf for holding a cap or lid 7 for closing a can end side and it can also be used to form a stop which prevents the jelly roll 5 from moving in the can.

By the claimed cylindrical secondary cell 1, the number of parts used, and the steps required for assembly can be minimized due to the electrode lead plate 6 being secured between the jelly roll 5 and the beading groove 3 in the beading process. In other words, there is no need for any additional steps, other than the beading, to secure the jelly roll 5 and/or the electrode lead plate 6.

By having a flange of the electrode lead plate 6 that is deformed by the beading groove 3, the pressure of the electrode lead plate 6 on the jelly roll 5 is ensured so that there is good electrical contact therebetween and also so that the jelly roll 5 is prevented from moving.

The electrode lead plate 6 comprises, for example, copper, when it is used on the positive side, i.e. the anode side, of the jelly roll 5.

The electrode lead plate 6 comprises, for example, aluminium, when it is used on the positive side, i.e. the cathode side, of the jelly roll 5.

According to some aspects, the flange of the electrode lead plate 6 is welded to the cylindrical can at the beading groove. The welding can be done either before beading or after beading of the cylindrical can. In other words, in the method of assembling the cylindrical secondary cell described below, there might be an additional step of welding the flange to the cylindrical can, either before or after beading. The welding is for example done from the outside of the cylindrical can, which is especially beneficial if the welding is done after beading because it is easier to reach the welding location. The welding method can be any method suitable to weld the cylindrical can to the electrode lead plate 6. The welding method is for example laser welding or resistance welding.

Figure 6:
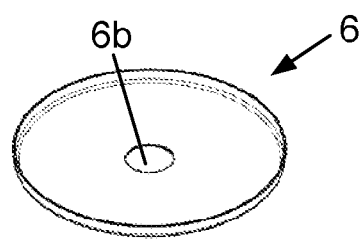
FIG. 6 shows an example of an electrode lead plate.
Figure 7:
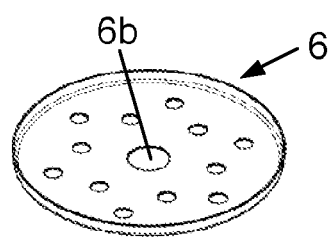
FIG. 7 shows an example of an electrode lead plate with more electrolyte filling holes.

FIG. 6 shows an example of an electrode lead plate. FIG. 7 shows an example of an electrode lead plate with more electrolyte filling holes.

According to some aspects, the electrode lead plate 6 comprises at least one through hole for electrolyte filling. Depending on how the cylindrical secondary cell 1 is filled with electrolyte, there may be a need to have a hole or several holes in the electrode lead plate 6 for filling and distribution of the electrolyte inside the cell. The at least one hole may be differently arranged than shown in the figures. The star shaped form in FIG. 7 may be beneficial if the electrode lead plate is to be welded to the uncoated part because the alignment of the holes allows for several straight welding lines across the disc, from one end to another.

Figure 8:
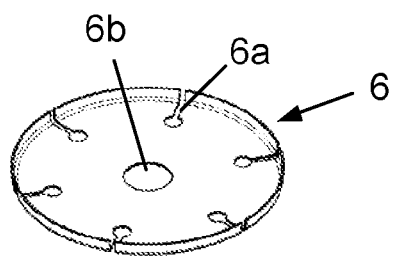
FIG. 8 shows an example of an electrode lead plate with slits in the edge.
Figure 9:
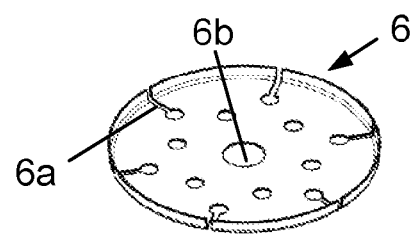
FIG. 9 shows an example of an electrode lead plate with slits in the edge and with more electrolyte filling holes.

FIG. 8 shows an example of an electrode lead plate with slits in the edge. FIG. 9 shows an example of an electrode lead plate with slits in the edge and with more electrolyte filling holes.

According to some aspects, the electrode lead plate 6 comprises at least one slit arranged in the flange and at least the edge of the electrode lead plate 6. When the flange of the electrode lead plate is deformed by the beading groove 3, at least one slit may be used to reduce stress in the electrode lead plate that may arise from the forces in the deformation. The at least one slit is for example cut out of the electrode lead plate. If the flange is made in a stamping process, the at least one slit may be made before the stamping or in the same process.

According to some aspects, the electrode lead plate 6 comprises at least two slits arranged in the flange and at least the edge of the electrode lead plate 6 in a symmetrical pattern around the edge.

Depending on the material of the electrode lead plate, more or fewer slits can be used to reduce stress in the material. The width of the slits can also be varied. For example, the electrode lead plate may comprise two slits which are wider than if the electrode lead plate has six slits. In other words, the one or more slits may be designed depending on material and the number of slits.

The at least one slits are formed on the flange and extending into the electrode lead plate from the edge and inwards. According to some aspect, the at least one slit extends into the electrode lead plate between 1 and 20 mm, preferably between 1 and 10 mm. According to some aspect, the at least one slit has a width of between 0.5 and 4 mm, and preferably between 0.5 and 2 mm. As an example, the at least one slit extends into the disc, directed towards the centre of the electrode lead plate, 5 mm and has a width of 1 mm.

As can be seen in the example electrode lead plates 6 of FIGS. 8 and 9, the at least one slits extend into at least some of the electrolyte filling holes.

As can be seen in the example of FIG. 1, the electrode lead plate 6 may be in direct contact with the cylindrical can 2. By having the lead plate in direct electrical contact with the cylindrical can 2, the side of the can be used as a terminal for external loads and also, the current can be led to either of the end sides of the cylindrical can 2 for having a terminal there. Thus, it is very flexible where to arrange the terminal. The lead plate is arranged in direct electrical and physical contact with the cylindrical can.

An example that is not shown in the figures is that the cylindrical secondary cell 1 may comprise an insulating member arranged between the electrode lead plate 6 and the cylindrical can 2. In such a case, the terminal will be arranged on the end side of the cylindrical can 2 associated with the first end side 5a of the jelly roll 5. A terminal arrangement on the end side may be arranged in electrical contact with the electrode lead plate 6.

Another example that is not shown in the figures is that a part closest to the edge of the electrode lead plate 6 may be bent towards the jelly roll 5. In other words, when the flange of the electrode lead plate 6 is bent inwards by the beading groove 3, the electrode lead plate 6 edge may be bent towards the jelly roll 5. The outer edge of the electrode lead plate 6 can thus be bent towards the jelly roll and the flange then first extends upwards before being bent inwards towards the centre of the cylindrical can.

As can be seen in the example of FIG. 1, the cylindrical secondary cell 1 may comprise a lid 7, wherein the lid 7 is resting on the beading groove 3, on a side of the beading groove 3 opposite the electrode lead plate 6. The lid 7 can be designed in different ways and fastened to the can by, for example, beading or seaming.

The opposite end side of the cylindrical secondary cell 1 than the one comprising the beading groove 3 is not discussed in this disclosure. There are many ways to connect the opposite side of the jelly roll 5 to a terminal and they do not impact how the electrode lead plate 6 is locked in place by the beading groove 3. In the case when the electrode lead plate is in direct contact with the cylindrical can 2, the terminal for an external load may be arranged on either side of the cylindrical can 2. As an example, one terminal of the cylindrical secondary cell 1 may be arranged in the centre of the bottom side, the bottom side being the bottom side when the cylindrical secondary cell is arranged as in FIGS. 2-5, and the other terminal may be arranged around the first terminal with an insulator therebetween.

The disclosure provides a method for assembling the cylindrical secondary cell 1 according to above. The assembling the cylindrical secondary cell 1 comprises:
- arranging the jelly roll 5 in the cylindrical can 2,
- arranging the electrode lead plate 6 in the cylindrical can 2 so that at least part of the portion free of first electrode coating 4a of the first conductive sheet 4 is in direct contact with the electrode lead plate 6,
- beading the cylindrical can 2 to form the beading groove 3 at a position on the cylindrical can 2 so that the flange of the electrode lead plate 6 is bent and pressed inwards, towards a centre of the cylindrical can 2, by the beading groove 3.

The method provides an efficient way to secure the jelly roll 5 and the electrode lead plate 6 in the cylindrical can 2. The steps and number of components are thus minimized. The same advantages as for the above also applies here. These steps can be seen in FIGS. 2 to 5.

According to some aspects, the method comprises, before beading, to arrange an insulating member between the electrode lead plate 6 and the cylindrical can 2. This is for the case when the electrode lead plate 6 is electrically connected to a terminal in the end side associated with the first end side 5a of the jelly roll 5 and not to the cylindrical can 2 side wall.

According to some aspects, the beading the cylindrical can 2, to form the beading groove 3 also bends a part of the electrode lead plate 6 which is closest to the edge towards the jelly roll 5.

The invention claimed is:

1. A cylindrical secondary cell (1) comprising:
   a cylindrical can (2) comprising a centre defining a longitudinal axis of the cylindrical can, and a beading groove (3) formed in a wall of the cylindrical can (2) and arranged around the circumference of the cylindrical can (2),
   a first conductive sheet (4), with first electrode coating (4a), wound to form a jelly roll (5) which is arranged in the cylindrical can (2), and wherein the first conductive sheet (4) comprises a portion free of first electrode coating (4a) which protrudes on a first end side (5a) of the jelly roll (5), and
   an electrode lead plate (6) which is electrically conductive and arranged at the first end side (5a) of the jelly roll (5) and in direct contact with at least part of the portion free of first electrode coating (4a) of the first conductive sheet (4),
   wherein:
   the electrode lead plate (6) comprises a flange (6a) extending around a substantial portion of a periphery of the electrode lead plate (6), the flange (6a) having a centre portion and an edge portion surrounding the centre portion, the flange (6a) extending away from the jelly roll (5) and arranged along an edge of the electrode lead plate (6),
   the beading groove (3) is arranged on the cylindrical can (2) such that the flange of the electrode lead plate (6) is bent and pressed inwards, towards a centre of the cylindrical can (2), by the beading groove (3), and the flange (6*a*) is bent such that the edge portion thereof is positioned closest to the edge of the electrode lead plate (6) and extends towards the centre of the cylindrical can (2).

2. The cylindrical secondary cell (1) according to claim 1, wherein the electrode lead plate (6) comprises at least one slit (6*a*) arranged in the flange and at least the edge of the electrode lead plate (6).

3. The cylindrical secondary cell (1) according to claim 2, wherein the electrode lead plate (6) comprises at least two slits (6*a*) arranged in the flange and at least the edge of the electrode lead plate (6) in a symmetrical pattern around the edge.

4. The cylindrical secondary cell (1) according to claim 1, wherein the electrode lead plate (6) comprises at least one through hole (6*b*) for electrolyte filling.

5. The cylindrical secondary cell (1) according to claim 1, wherein the electrode lead plate (6) is in direct contact with the cylindrical can (2).

6. The cylindrical secondary cell (1) according to claim 1, wherein the flange of the electrode lead plate (6) is welded to the cylindrical can (3).

7. The cylindrical secondary cell (1) according to claim 1, comprising an insulating member arranged between the electrode lead plate (6) and the cylindrical can (2).

8. The cylindrical secondary cell (1) according to claim 1, further comprising a lid (7), wherein the lid (7) is resting on the beading groove (3), on a side of the beading groove (3) opposite the electrode lead plate (6).

9. Method for assembling the cylindrical secondary cell (1) according to claim 1, wherein the method comprises:
arranging the jelly roll (5) in the cylindrical can (2),
arranging the electrode lead plate (6) in the cylindrical can (2) so that at least part of the portion (4*a*) free of first electrode coating (4*a*) of the first conductive sheet (4) is in direct contact with the electrode lead plate (6), and
beading the cylindrical can (2) to form the beading groove (3) at a position on the cylindrical can (2) so that the flange of the electrode lead plate (6) is bent and pressed inwards, towards the centre of the cylindrical can (2), by the beading groove (3).

10. The method according to claim 9, further comprising, before beading, the step of arranging an insulating member between the electrode lead plate (6) and the cylindrical can (2).

11. The method according to claim 9, further comprising the step of welding the flange to the cylindrical can.

12. The method according to claim 9, wherein the beading of the cylindrical can (2) to form the beading groove (3) also bends a part of the electrode lead plate (6) which is closest to the edge towards the jelly roll (5).

13. The method according to claim 10, wherein the beading of the cylindrical can (2) to form the beading groove (3) also bends a part of the electrode lead plate (6) which is closest to the edge towards the jelly roll (5).

* * * * *